United States Patent
Brevick et al.

(10) Patent No.: US 9,470,291 B2
(45) Date of Patent: Oct. 18, 2016

(54) PRODUCTION FEASIBLE PENDULUM CRANKSHAFT

(71) Applicant: Ford GLobal Technologies, LLC, Dearborn, MI (US)

(72) Inventors: John Edward Brevick, Livonia, MI (US); Jeffrey Eliot Chottiner, Farmington Hills, MI (US); Rick L. Williams, Canton, MI (US); Mike A. Kopmanis, Monroe, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 93 days.

(21) Appl. No.: 14/246,313

(22) Filed: Apr. 7, 2014

(65) Prior Publication Data

US 2015/0285333 A1    Oct. 8, 2015

(51) Int. Cl.
| | |
|---|---|
| F16F 15/26 | (2006.01) |
| F16C 3/20 | (2006.01) |
| F16F 15/28 | (2006.01) |
| F16F 15/34 | (2006.01) |
| F16F 15/14 | (2006.01) |

(52) U.S. Cl.
CPC .............. *F16F 15/26* (2013.01); *F16F 15/145* (2013.01); *F16F 15/283* (2013.01); *F16F 15/34* (2013.01); *F16C 3/20* (2013.01)

(58) Field of Classification Search
CPC .......... F16F 15/24; F16F 15/26; F16F 15/28; F16F 15/283; F16F 15/322; F16F 15/34; F16F 15/145; F16F 2226/04; F16F 2226/041; F16F 2226/044; F16F 2226/045; F16F 2230/0011; F16F 2232/02; F16C 3/20
USPC ....................... 123/192.2, 192.1; 74/603, 604
See application file for complete search history.

(56) References Cited

U.S. PATENT DOCUMENTS

| | | | | | |
|---|---|---|---|---|---|
| 1,865,108 | A | * | 6/1932 | Hutchinson | F16F 15/283 74/604 |
| 2,154,063 | A | * | 4/1939 | Chilton | F16F 15/26 74/604 |
| 2,332,072 | A | * | 10/1943 | Gregory | F16F 15/145 74/604 |
| 2,540,880 | A | * | 2/1951 | Hey | F16F 15/14 74/604 |
| 4,739,679 | A | | 4/1988 | Berger et al. | |
| 5,495,924 | A | * | 3/1996 | Shaw | F16F 15/145 188/378 |
| 6,135,727 | A | * | 10/2000 | Dreiman | F04B 39/0094 417/415 |
| 6,688,272 | B2 | * | 2/2004 | Brevick | F02B 75/22 123/192.2 |

(Continued)

FOREIGN PATENT DOCUMENTS

GB    2186051 A    8/1987

*Primary Examiner* — Grant Moubry
(74) *Attorney, Agent, or Firm* — LeClairRyan

(57) ABSTRACT

A pendulum absorber fixed to the crankshaft of an engine comprises a pendulum and a pendulum carrier attached to the pendulum carrier attachment boss of the crankshaft. Each pendulum carrier has a pair of parallel ears extending therefrom. The carrier is tightly attached to the attachment boss such that the attachment boss is captured between the ears of the carrier. Attachment of the pendulum carrier to the sides of the attachment boss allows for feasibility in production, unlike known arrangements which require attachment of the pendulum carrier to the top of the crankshaft web. The fastener may be a pair of pressed-in pins, a single shrink-fit pin, shoulder bolts, Z-Form™ fastener assemblies, or rivets. Regardless of the type of fastener used, the side attachment arrangement of the disclosed inventive concept is sufficient to carry the load in sheer and prevent the pendulum assemblies from moving relative to the crankshaft.

16 Claims, 6 Drawing Sheets

(56) References Cited

U.S. PATENT DOCUMENTS

| | | | | |
|---|---|---|---|---|
| 8,813,604 B2* | 8/2014 | Geist | ................... | F16F 15/145 123/192.2 |
| 8,918,994 B2* | 12/2014 | Chottiner | ................ | F16F 15/22 123/192.2 |
| 2013/0098198 A1* | 4/2013 | Geist | .................... | F16F 15/145 74/604 |

* cited by examiner

PRODUCTION FEASIBLE PENDULUM CRANKSHAFT

TECHNICAL FIELD

The disclosed inventive concept relates generally to absorbers to reduce torsional vibration in an internal combustion engine. More particularly, the disclosed inventive concept relates to pendulum absorbers mounted by fasteners including one or more pressed-in pins, bolts or rivets attached to the side of the crankshaft to facilitate production assembly.

BACKGROUND OF THE INVENTION

Internal combustion engines having a relatively small number of cylinders provide automobile makers with an attractive solution to the need for improved fuel economy. In order to compensate for reduction of cubic capacity vehicle manufacturers developed technologies to improve engine power, such as direct fuel injection, turbocharging, and variable timing for inlet and exhaust camshafts. In this way six- and eight-cylinder engines can be scaled down without losing available horsepower.

An undesirable consequence of engines with a small number of cylinders is high crankshaft torsional vibration and high engine block vibration caused by forces, such as first and second order forces, that are not cancelled. Such vibrations are ultimately transmitted through the engine mounts and driveline to the vehicle structure.

Engineers managed these vibrations to one extent or another through a variety of approaches, many of which increase the cost of construction and reduce fuel economy. One accepted solution to overcome excessive vibration is the provision of one or more pendulums on the crankshaft to lower the torsional vibration of the crankshaft and the consequent driveline vibration. Such crankshaft-mounted pendulums function as vibration absorbers as they are tuned to address and thus cancel out vibrations generated by crankshaft rotation, thus smoothing torque output of the crankshafts. This approach is taken as well by designers of some airplane piston engines where the pendulums smooth output torque and reduce rigid body motion.

An example of a pendulum vibration absorber associated with an engine crankshaft is set forth in U.S. Pat. No. 4,739,679, assigned to the assignee of the instant application. According to the arrangement set forth in this patent, the pendulum is bolted to the crankshaft so that the shoulder bolts carry the load in sheer along the shoulder. However, the pendulum of this design is intended for an I-4 engine that does not require counterweights for balancing insofar as an I-4 is balanced in first order. Accordingly, so long as the pendulums are symmetric, the I-4 will still be balanced.

Such is not the case for the I-3 engine. In this engine, pendulums are necessary as counterweights for balance since the I-3 engine has a first order pitching moment. To obtain the necessary balance without adding the large inertia of U.S. Pat. No. 4,739,679, the pendulums must be designed in a similar shape as a conventional counterweight.

However, attachment to the crankshaft has been calculated to result in bolt failure at high speed due to sheer. The prototype method of attaching a pendulum crankshaft is not feasible in production. One method conceived was to bolt on the pendulums along the sides. This method is not feasible since the clamp load is not sufficient to prevent the pendulum from moving radially. The clamp load interface would slip and bolts would fail in sheer.

Thus a new approach to the attachment of the pendulum to the crankshaft in smaller engines is needed to address the problems associated with known arrangements and to reduce the amount of torsional vibration produced by the internal combustion engine.

SUMMARY OF THE INVENTION

The disclosed inventive concept overcomes the problems associated with known approaches to reducing torsional vibrations generated in operating internal combustion engines having a small displacement, such as three cylinder engines. The disclosed inventive concept accomplishes this step by providing a pair of opposed fasteners positioned coaxially on both sides of the pendulum carrier for attachment to the pendulum carrier attachment boss of the crankshaft.

Particularly, the vibrational absorber assembly of the disclosed inventive concept includes a rotational element typically in the form of a crankshaft and pendulum assemblies attached to the crankshaft. Each pendulum assembly includes a pendulum and a pendulum carrier to which the pendulum is attached. The crankshaft has pendulum carrier attachment bosses to which the pendulum carriers are attached.

Each pendulum carrier has a pair of parallel ears extending therefrom. The carrier is tightly attached to the crankshaft pendulum carrier attachment boss such that the pendulum carrier attachment boss is captured between the ears of the carrier. Fastener-passing holes are formed in the ears while fastener-receiving holes are formed in the pendulum carrier attachment boss. All of these holes are coaxial.

The fastener may include one or more of pressed pins, a single shrink-fit pin, shoulder bolts, Z-Form™ fastener assemblies, or rivets. The pressed pins and the shrink-fit pin define an interference fit whereas the shoulder bolts and the rivets define a tight fit for the fastener. Regardless of the type of fastener used, the arrangement of the disclosed inventive concept wherein the fasteners attach the pendulum carrier to the pendulum carrier attachment boss from the side are sufficient to carry the load in sheer and prevent the pendulum assemblies from moving relative to the crankshaft. Attachment of the pendulum carrier to the sides of the pendulum carrier attachment boss allows the disclosed inventive concept to be feasible in production, unlike known arrangements which require attachment of the pendulum carrier to the top of the crankshaft web. Accordingly, the disclosed inventive concept overcomes the problems associated with known arrangements in which the clamp load interface is known to slip and attachment bolts fail in sheer.

The above advantages and other advantages and features will be readily apparent from the following detailed description of the preferred embodiments when taken in connection with the accompanying drawings.

BRIEF DESCRIPTION OF THE DRAWINGS

For a more complete understanding of this invention, reference should now be made to the embodiments illustrated in greater detail in the accompanying drawings and described below by way of examples of the invention wherein.

DETAILED DESCRIPTION OF THE PREFERRED EMBODIMENT

Figure 1:
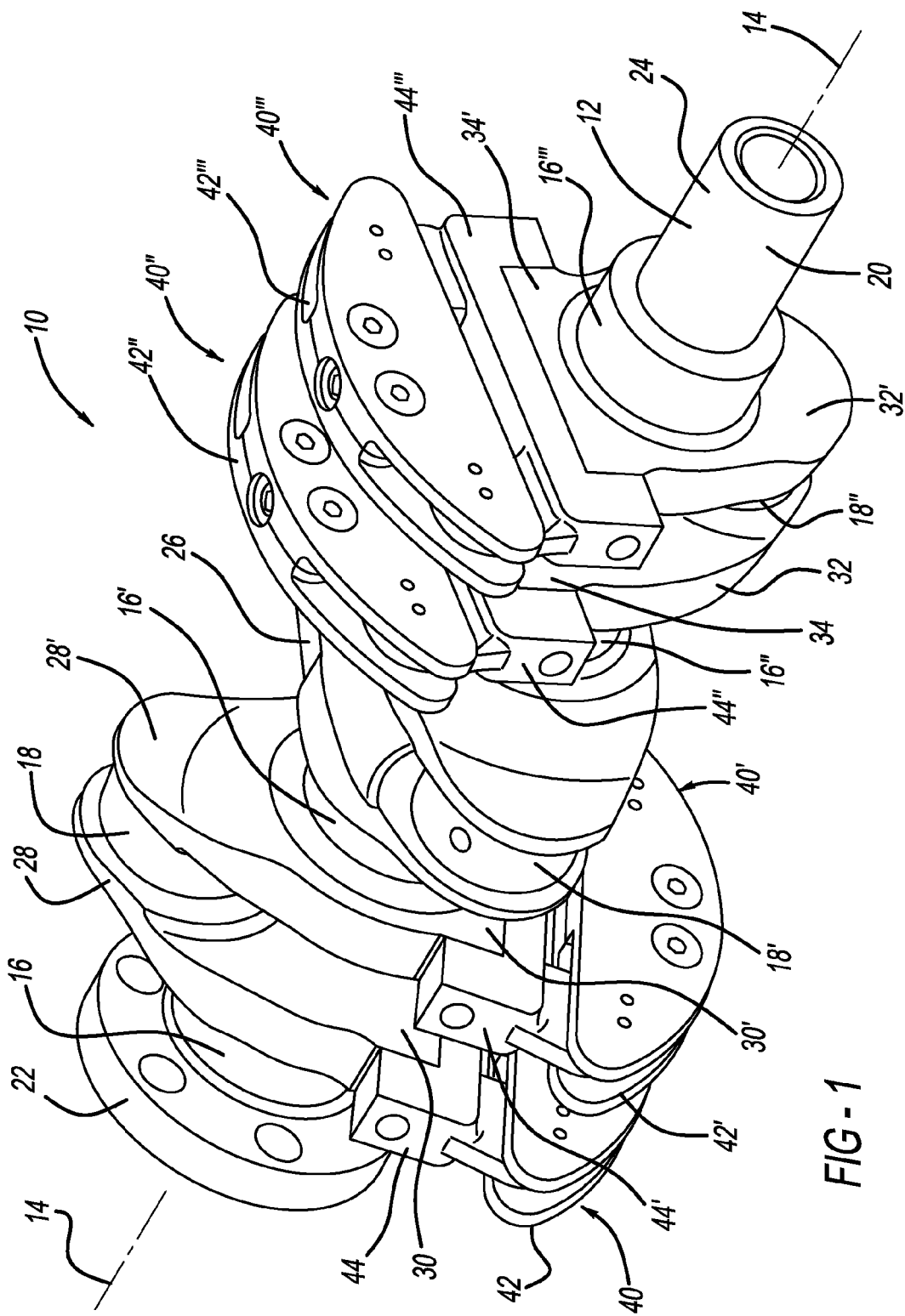
FIG. 1 is a perspective view of a crankshaft having pendulum assemblies attached to the side of the crankshaft by one or more pins, bolts or rivets according to the disclosed inventive concept.

In the following figures, the same reference numerals will be used to refer to the same components. In the following description, various operating parameters and components are described for different constructed embodiments. These specific parameters and components are included as examples and are not meant to be limiting.

Referring to FIG. 1, a perspective view of a crankshaft assembly for an internal combustion engine is illustrated. Referring to FIGS. 2 through 6, end views of alternate embodiments of the disclosed inventive concept are illustrated in which a pendulum-carrier assembly is attached to the crankshaft by pins in FIG. 2, by a single pressed pin in FIG. 3, by shoulder bolts in FIG. 4, by Z-Form™ fasteners in FIG. 5, and by rivets in FIG. 6. It is to be understood that the overall configuration of the illustrated crankshaft assembly shown in the figures is set forth for suggestive purposes only as the overall configuration may be altered from that illustrated without deviating from the spirit or scope of the invention.

As illustrated in FIG. 1, the crankshaft assembly 10 includes a crankshaft 12. The crankshaft 12 has a rotational axis 14. Rotation of the crankshaft 12 about its rotational axis 14 is made possible by the provision of main journals 16, 16', 16" and 16'". The journals 16, 16', 16" and 16'" are integrally formed as part of the crankshaft 10 and are restrained within the engine block (not shown) by crankshaft bearings (not shown).

The connecting rods (not shown) are attached as is known in the art to rod journals 18, 18' and 18" by rod bearings. The rod journals 18, 18' and 18" are integrally formed on the crankshaft 12, again as is known in the art.

The crankshaft 12 includes a first end 20 and a second end 22. Conventionally provided extending from one end, in this case the first end 20, is a post 24. The post 24 serves as a mount for any number of engine components, such as an absorber, a fan belt pulley and a drive mechanism for a camshaft. These components are not shown but these components and their methods of attachment are known to those skilled in the art.

Conventionally attached to the other end of the crankshaft 12, in this case the second end 22, is a flywheel (not shown). The flywheel, which assists in reducing torsional fluctuations in the crankshaft 12, is in operative engagement with the drive shaft or transaxle of the vehicle.

Counterweights are formed as integral components of the crankshaft 12. Counterweight 26 is illustrated while an identical counterweight (not shown) is provided for in spaced apart relation from the counterweight 26. It is understood that the conventional modern internal combustion engine includes one or more such counterweights to provide balance to the crankshaft 12, the connecting rods, and their associated pistons.

To each side of the rod journal 18 is provided a spaced apart pair of crank webs 28 and 28'. Extending from the crank web 28 is a pendulum carrier attachment boss 30 and extending from the crank web 28' is a pendulum carrier attachment boss 30'.

To each side of the rod journal 18" is provided a spaced apart pair of crank webs 32 and 32'. Extending from the crank web 32 is a pendulum carrier attachment boss 34 and extending from the crank web 32' is a pendulum carrier attachment boss 34'. It is to be understood that more pendulums may be provided than are shown in FIG. 1 up to the number of crank webs.

The disclosed inventive concept provides pendulum assemblies for attachment to the crankshaft 12. Particularly, a pendulum assembly 40 is attached to the pendulum carrier attachment boss 30, a pendulum assembly 40' is attached to the pendulum carrier attachment boss 30', a pendulum assembly 40" is attached to the pendulum carrier attachment boss 34, and a pendulum assembly 40'" is attached to the pendulum carrier attachment boss 34'.

Each of the pendulum assemblies 40, 40', 40" and 40'" includes a pendulum and a pendulum carrier. The pendulum carrier is attached to the pendulum carrier attachment boss of the crank. Particularly, the pendulum assembly 40 includes a pendulum 42 attached to a pendulum carrier 44, the pendulum assembly 40' includes a pendulum 42' attached to a pendulum carrier 44', the pendulum assembly 40" includes a pendulum 42" attached to a pendulum carrier 44", and the pendulum assembly 40'" includes a pendulum 42'" attached to a pendulum carrier 44'".

The pendulum carrier 44 is attached to the pendulum carrier attachment boss 30. The pendulum carrier 44' is attached to the pendulum carrier attachment boss 30'. The pendulum carrier 44" is attached to the pendulum carrier attachment boss 34. And the pendulum carrier 44'" is attached to the pendulum carrier attachment boss 34'.

According to the disclosed inventive concept, the pendulum carriers are attached to their respective pendulum carrier attachment bosses by elongated, mechanical fasteners positioned through the pendulum carriers and into the pendulum carrier attachment bosses. The disclosed inventive concept provides for two methods of mechanical fastening that may be used alone or in combination.

Figure 2:
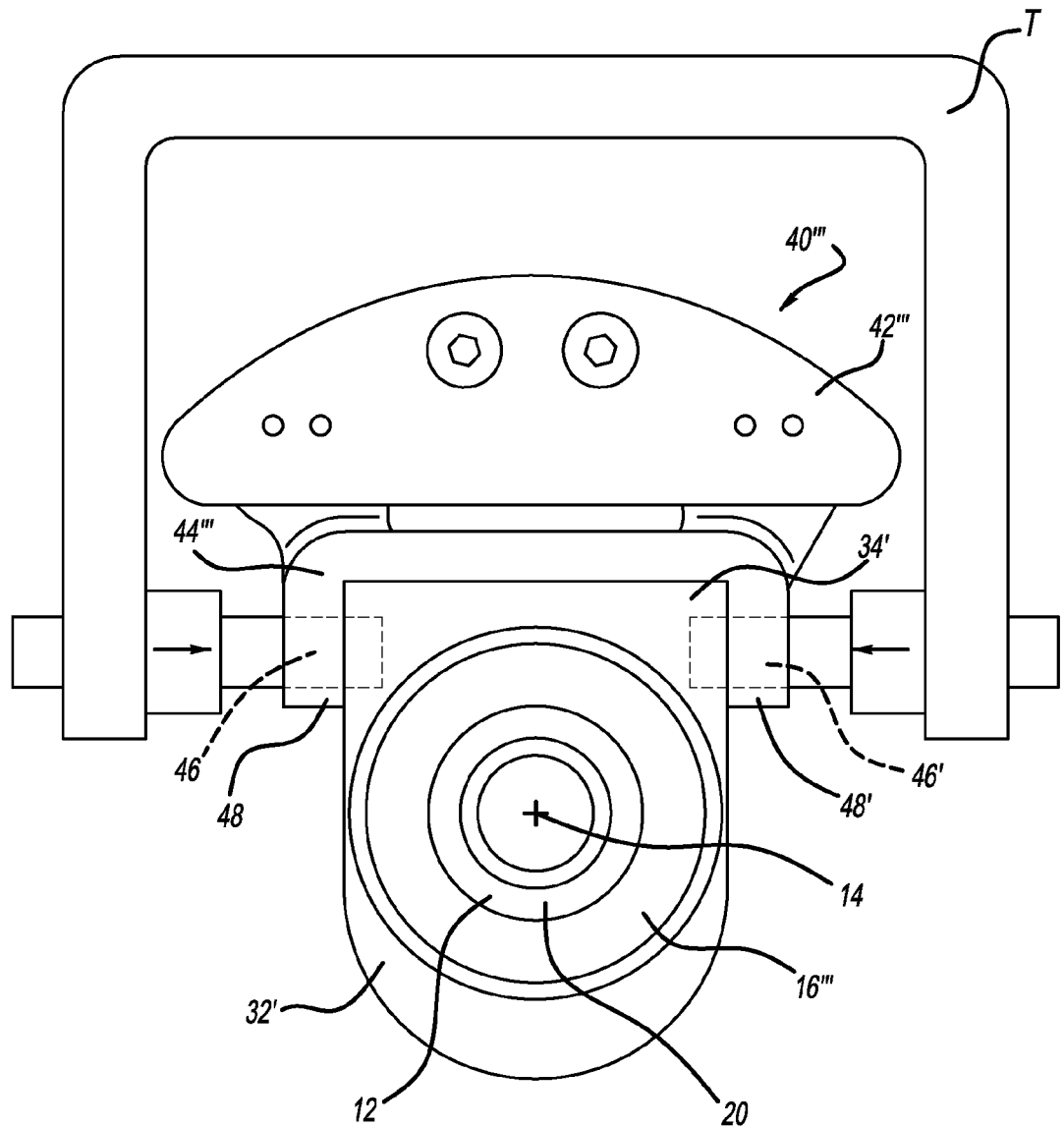
FIG. 2 is an end view of a pendulum assembly attached to a crankshaft by pins according to one embodiment of the disclosed inventive concept.

One embodiment of mechanical attachment according to the disclosed inventive concept is illustrated in FIG. 2 in which an end view of the pendulum assembly 40'" attached to the crankshaft 12 is attached by pressed-in pins 46 and 46' is shown. The pressed-in pins 46 and 46' pass through holes formed in parallel ears 48 and 48' that extend from the pendulum carrier 44'" and into holes formed in alignment in the pendulum carrier attachment boss 34'. The pressed-in pins 46 and 46' may be of a variety of diameters, though a non-limiting diameter may be 8.0 mm. The pressed-in pins 46 and 46' are pressed in to assure good attachment by way of an interference fit. This method of attachment, coupled with the tight fit of the pendulum carrier 44'" to the pendulum carrier attachment boss 34', restricts movement of the pendulum assembly 40'" relative to the crankshaft 12.

A number of tools may be used for pressing the pressed-in pins 46 and 46' through the holes formed in parallel ears 48 and 48' and into the holes formed in alignment in the pendulum carrier attachment boss 34'. One such tool, illustrated as T, is shown. The tool T is suggestive and is not intended as being limiting.

Figure 3:
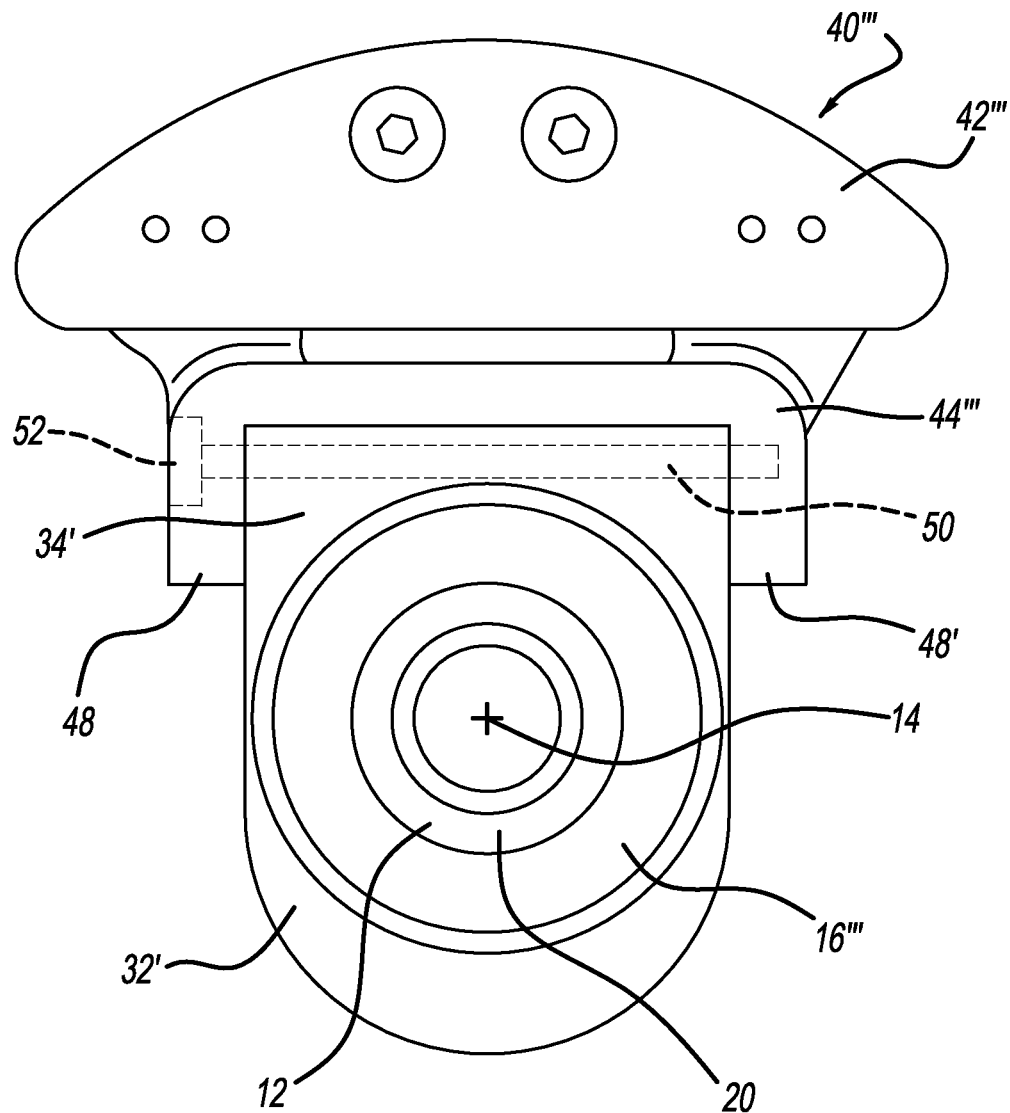
FIG. 3 is an end view of a pendulum assembly attached to a crankshaft by a single, shrink-fit pin according to one embodiment of the disclosed inventive concept.

A variation of the mechanical attachment of the pendulum assembly 40''' to the crankshaft 12 illustrated in FIG. 2 in which two pressed-in pins 46 and 46' are illustrated is shown in FIG. 3 in which a single, shrink-fit pin 50 is applied. The shrink-fit pin 50 passes through holes formed in parallel ears 48 and 48' that extend from the pendulum carrier 44''' and through a hole formed in the pendulum carrier attachment boss 34'. A cap 52 formed at one end of the shrink-fit pin 50 limits the depth to which the shrink-fit pin 50 may be inserted.

The shaft of the shrink-fit pin 50 may be of a variety of diameters, though a non-limiting diameter may be 8.0 mm. The shrink-fit pin 50 is pressed in to assure good attachment by way of an interference fit using a tool similar to that illustrated in FIG. 2. This method of attachment, coupled with the tight fit of the pendulum carrier 44''' to the pendulum carrier attachment boss 34', again restricts movement of the pendulum assembly 40''' relative to the crankshaft 12.

Figure 4:
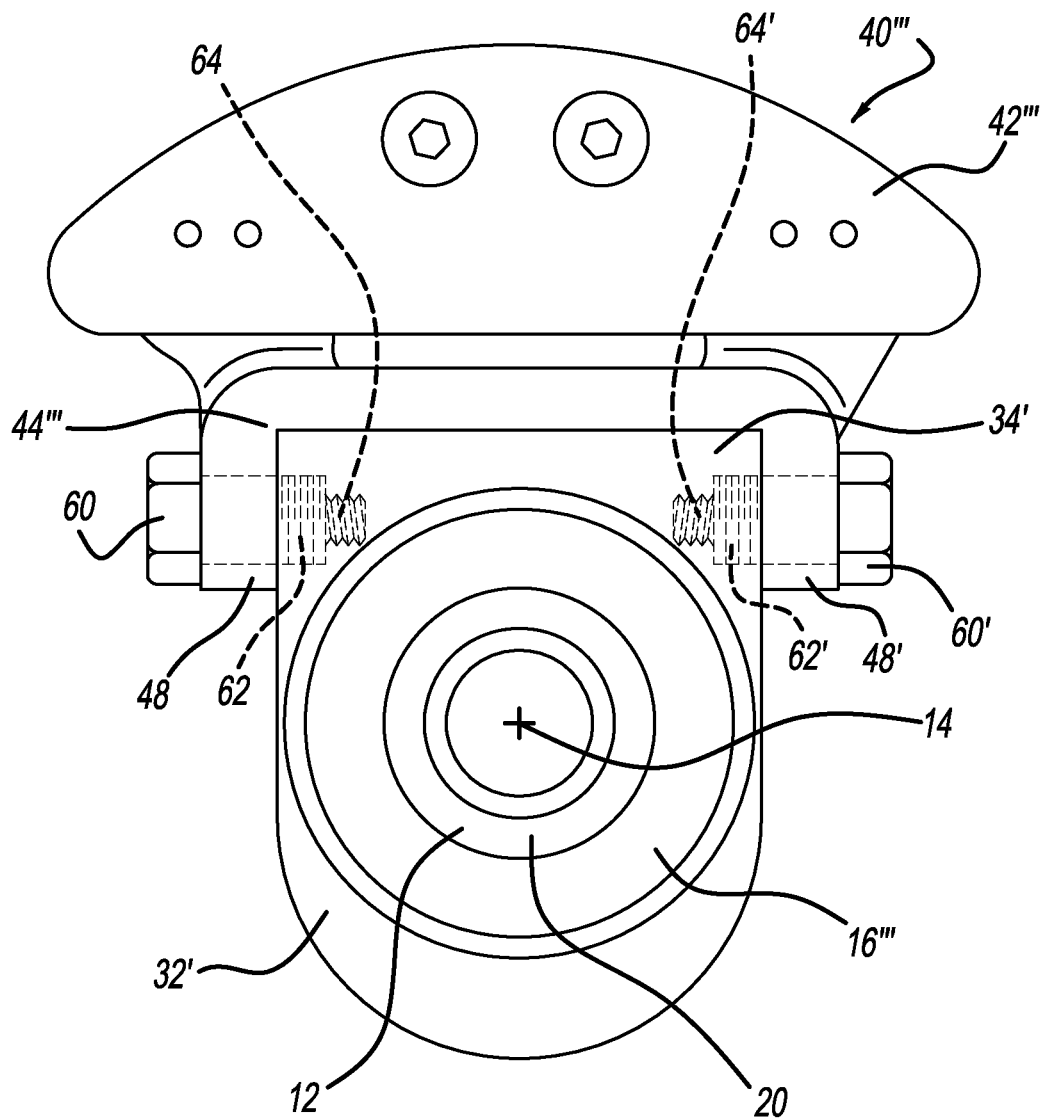
FIG. 4 is an end view of a pendulum assembly attached to a crankshaft by shoulder bolts according to another embodiment of the disclosed inventive concept.

A third embodiment of mechanical attachment according to the disclosed inventive concept is illustrated in FIG. 4 in which an end view of the pendulum assembly 40''' attached to the crankshaft 12 is attached by shoulder bolts 60 and 60' is shown. The shoulder bolt 60 includes a shoulder 62 and a threaded end 64. The shoulder bolt 60' includes a shoulder 60' and a threaded end 64'. The bolts 60 and 60' may be of a variety of diameters, though a non-limiting diameter may be 8.0 mm.

The shoulder bolts 60 and 60' pass through holes formed in the ears 48 and 48' of the pendulum carrier 44''' and into threaded holes formed in alignment in the pendulum carrier attachment boss 34'. The shoulders 62 and 62' have a tight fit relative to the holes formed in the ears 48 and 48' of the pendulum carrier 44''' and in the pendulum carrier attachment boss 34'.

Figure 5:
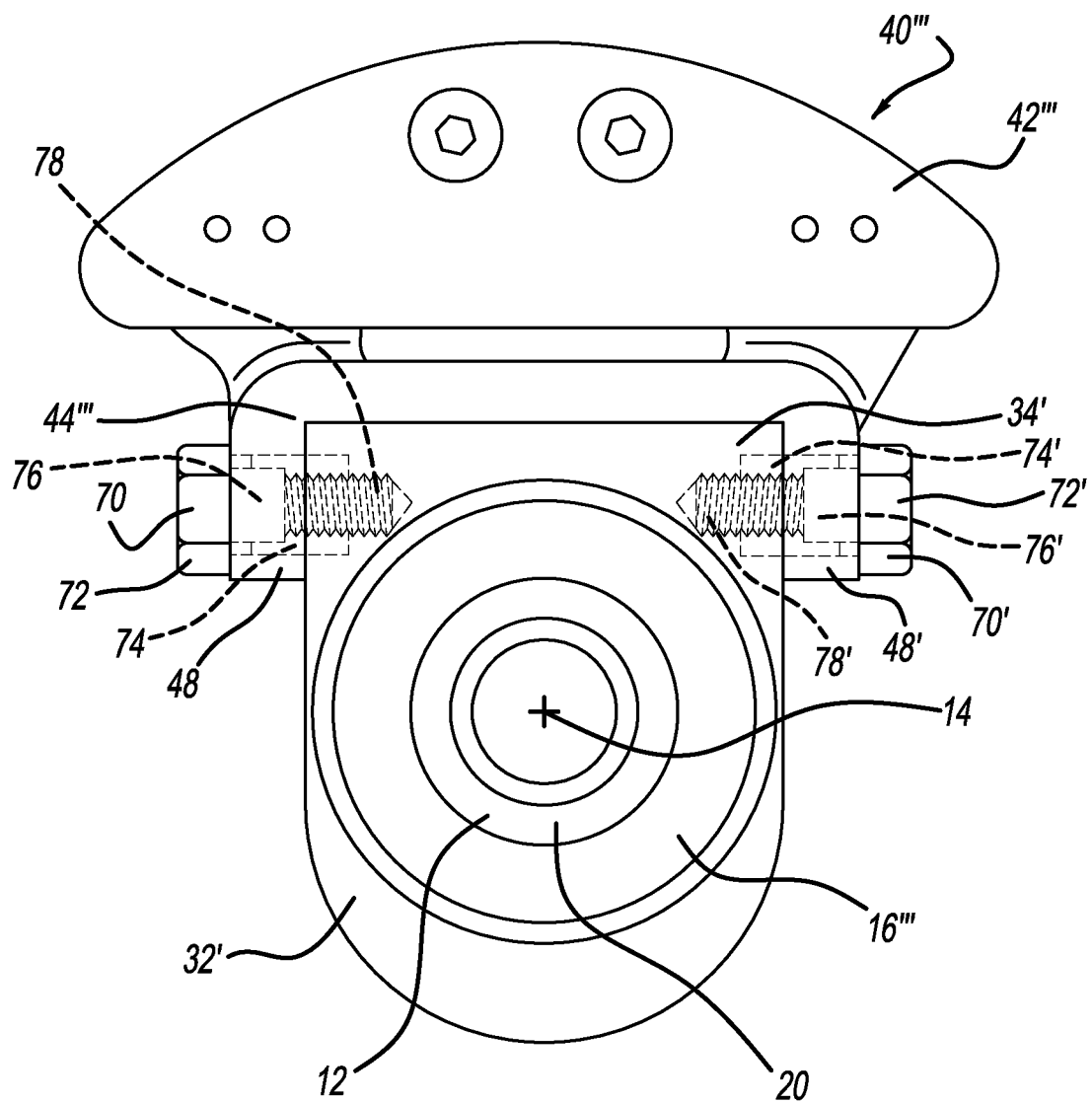
FIG. 5 is an end view of a pendulum assembly attached to a crankshaft by Z-Form™ fasteners according to an additional embodiment of the disclosed inventive concept.

A fourth embodiment of mechanical attachment according to the disclosed inventive concept is illustrated in FIG. 5 in which an end view of the pendulum assembly 40''' attached to the crankshaft 12 is attached by Z-Form™ fastener assemblies 70 and 70' is shown. (Z-Form™ is a product of Acument Global Technologies.) The fastener assembly 70 includes a shoulder bolt 72 and a pre-assembled deformable sleeve 74. The shoulder bolt 72 includes a shoulder 76 and a threaded end 78. The fastener assembly 70' includes a shoulder bolt 72' and a pre-assembled deformable sleeve 74'. The shoulder bolt 72' includes a shoulder 76' and a threaded end 78'. The shoulder bolts 72 and 72' may be of a variety of diameters, though a non-limiting diameter may be 8.0 mm.

The pre-assembled deformable sleeves 74 and 74' pass through holes formed in the ears 48 and 48' of the pendulum carrier 44''' and into holes formed in the pendulum carrier attachment boss 34'. The shoulder bolts 72 and 72' are then inserted into and through the pre-assembled deformable sleeves 74 and 74' and are threaded into the pendulum carrier attachment boss 34'. The fastener assemblies 70 and 70' eliminate undesirable clearance between the shoulder bolts 72 and 72' and the bolt-passing holes formed in the pendulum carrier 44'''.

Figure 6:
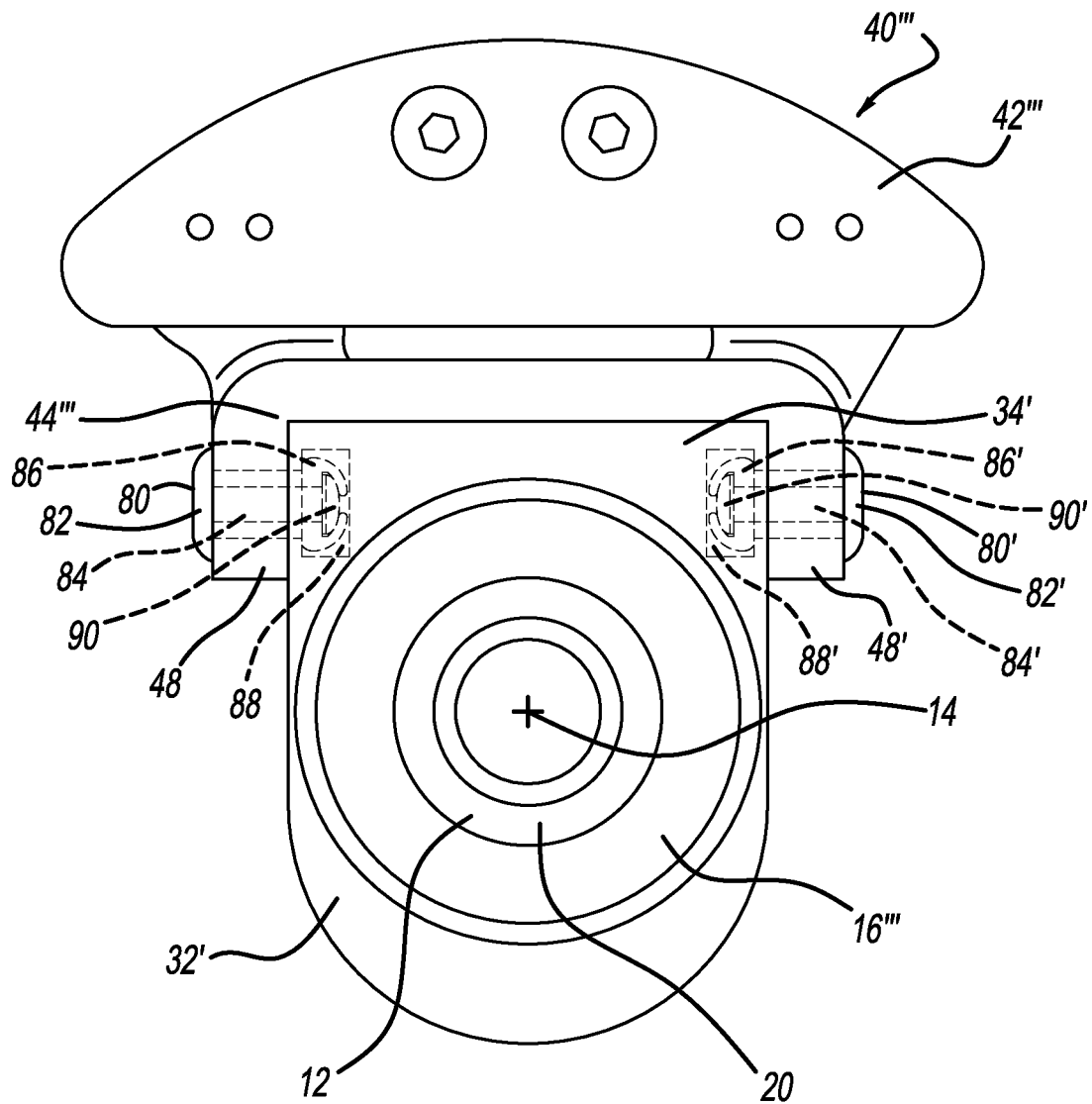
FIG. 6 is an end view of a pendulum assembly attached to a crankshaft by a rivets according to a further embodiment of the disclosed inventive concept.

A fifth embodiment of mechanical attachment according to the disclosed inventive concept is illustrated in FIG. 6 in which an end view of the pendulum assembly 40''' attached to the crankshaft 12 is attached by blind rivets 80 and 80' is shown. The blind rivet 80 includes a rivet head 82 and a shank 84 extending therefrom. An upset head 86 is formed at the end of the shank 84 after the blind rivet 80 is attached. A cavity 88 is formed in the pendulum carrier attachment boss 34' to accommodate the upset head 86. A retained mandrel head 90 forms the upset head 86 as is known in the art.

The blind rivet 80' includes a rivet head 82' and a shank 84' extending therefrom. An upset head 86' is formed at the end of the shank 84' after the blind rivet 80' is attached. A cavity 88' is formed in the pendulum carrier attachment boss 34' to accommodate the upset head 86'. A retained mandrel head 90' forms the upset head 86', again as is known in the art.

Whether pressed pins 46 and 46', the shrink-fit pin 50, the shoulder bolts 60 and 60', the fastener assemblies 70 and 70', or the rivets 80 and 80' are used, the disclosed inventive concept are sufficient to carry the load in sheer and prevent the pendulum assemblies 40, 40', 40'', and 40''' from moving relative to the crankshaft 12.

The disclosed inventive concept provides a method of fixedly and efficiently attaching a pendulum assembly to a crankshaft having sufficient strength to carry the load in sheer while preventing movement of the pendulum assembly relative to the crankshaft. Thus the disclosed inventive concept overcomes the problems associated with known arrangements in which the clamp load interface is known to slip and attachment bolts fail in sheer.

One skilled in the art will readily recognize from such discussion, and from the accompanying drawings and claims that various changes, modifications and variations can be made therein without departing from the true spirit and fair scope of the invention as defined by the following claims.

What is claimed is:

1. A vibrational absorber assembly for an internal combustion engine, the assembly comprising:
    a crankshaft having a boss with first and second sides;
    a pendulum assembly including a pendulum carrier and a pendulum;
    a fastener-passing hole formed in said pendulum carrier;
    a first carrier hole formed in said first boss side, a second carrier hole formed in said second boss side, said carrier holes and said fastener-passing hole being coaxial; and
    at least one fastener, said at least one fastener being fitted into at least one of said first carrier hole or said second carrier hole.

2. The vibrational absorber assembly for the internal combustion engine of claim 1 wherein said at least one fastener is selected from a group consisting of a pin, a bolt and a rivet.

3. The vibrational absorber assembly for the internal combustion engine of claim 2 wherein said pin is a pressed-in pin.

4. The vibrational absorber assembly for the internal combustion engine of claim 2 wherein said pin is a shrink-fit pin.

5. The vibrational absorber assembly for the internal combustion engine of claim 2 wherein said bolt is a shoulder bolt.

6. The vibrational absorber assembly for the internal combustion engine of claim 1 wherein said pendulum carrier defines a u-shaped body, said u-shaped body having parallel attachment ears, said first and second carrier holes being formed through said parallel attachment ears.

7. A vibrational absorber assembly for an internal combustion engine, the assembly comprising:
    a crankshaft having a long axis and a boss;
    a pendulum carrier having a pair of ears;

a first hole having an first hole axis formed in one of said ears;

a second hole having a second hole axis formed in one of said ears, a fastener hole having a fastener hole axis formed in at least part of said boss, said first hole axis, said second hole axis, and said fastener hole axis being in alignment and being perpendicular to said long axis;

a first fastener inserted through said first hole and a second fastener inserted through said second hole, said first and second fasteners being axially aligned.

8. The vibrational absorber assembly for the internal combustion engine of claim 7 wherein said pair of ears are parallel and said pendulum carrier defines a u-shaped body.

9. The vibrational absorber assembly for the internal combustion engine of claim 8 wherein said boss includes a first side and a second side and wherein one of said ears of said pendulum carrier is attached to said first side of said boss and an other of said ears of said pendulum carrier is attached to said second side of said boss.

10. The vibrational absorber assembly for the internal combustion engine of claim 7 wherein said fastener is selected from a group consisting of a pin, a bolt and a rivet.

11. The vibrational absorber assembly for the internal combustion engine of claim 10 wherein said pin is a pressed-in pin.

12. The vibrational absorber assembly for the internal combustion engine of claim 10 wherein said pin is a shrink-fit pin.

13. The vibrational absorber assembly for the internal combustion engine of claim 10 wherein said bolt is a shoulder bolt.

14. The vibrational absorber assembly for the internal combustion engine of claim 7 wherein said fastener hole formed in at least part of said boss is formed completely through said boss.

15. The vibrational absorber assembly for the internal combustion engine of claim 7 wherein said fastener hole formed in at least part of said boss comprises two axially-aligned holes.

16. A vibrational absorber assembly comprising:

a rotational element having a hole having a long axis, said element formed on a crankshaft having a long axis, said axis of said hole being perpendicular to said axis of said crankshaft;

a crankshaft having a boss, said boss having a first side with a hole and a second side with a hole, said holes being aligned;

a pendulum assembly having a pair of ears;

a first hole formed in one of said ears and a fastener extending through said first ear hole and into said first side hole; and a second hole formed in an other of said ears and a fastener extending through said second ear hole and into said second side hole, each of said holes having a long axis, said axes being axially aligned and being coaxial with said hole formed in element; and a fastener fitted in said first and second holes and said element hole.

* * * * *